(12) United States Patent
Gruschwitz et al.

(10) Patent No.: US 6,382,250 B1
(45) Date of Patent: May 7, 2002

(54) SOLENOID VALVE WITH A CHECK VALVE

(75) Inventors: Peggy Gruschwitz, Stuttgart; Martin Oehler, Weinsberg; Heike Bauer, Stuttgart; Rolf Nicodemus, Bietigheim-Bissingen; Ralf Schindler, Leonberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/715,025

(22) Filed: Nov. 20, 2000

(30) Foreign Application Priority Data

Nov. 20, 1999 (DE) .......................... 199 55 888

(51) Int. Cl.[7] .............................. F16K 15/02; B60T 8/40
(52) U.S. Cl. ............. 137/601.14; 137/519; 137/601.21; 303/116.1
(58) Field of Search .................... 137/601.14, 601.2, 137/601.21, 533.19, 533.31, 519, 516.29; 303/116.1, 900

(56) References Cited

U.S. PATENT DOCUMENTS

| | | | | |
|---|---|---|---|---|
| 3,862,641 A | * | 1/1975 | Follett | 137/519 |
| 4,128,105 A | * | 12/1978 | Follett | 137/533.27 |
| 4,862,913 A | * | 9/1989 | Wildfang | 137/543 |
| 5,052,435 A | * | 10/1991 | Crudup et al. | 137/516.29 |
| 5,664,849 A | * | 9/1997 | Burgdorf et al. | |

* cited by examiner

Primary Examiner—Stephen M. Hepperle
(74) Attorney, Agent, or Firm—Ronald E. Greigg

(57) ABSTRACT

A solenoid valve useful in a slip-controlled hydraulic brake system of a motor vehicle, and which has a seat valve disposed between a pressure fluid inlet and a pressure fluid outlet and in the bypass to this seat valve, has a check valve with a hollow conical valve seat and a closing body, which has a section that is embodied as complementary to the hollow conical valve seat. A rubber-elastic sealing ring is accommodated with the greater portion of its cross section in the circumference of the section and in the closed position of the check valve, this sealing ring can compensate for dimensional deviations of the valve seat at low pressures.

4 Claims, 1 Drawing Sheet

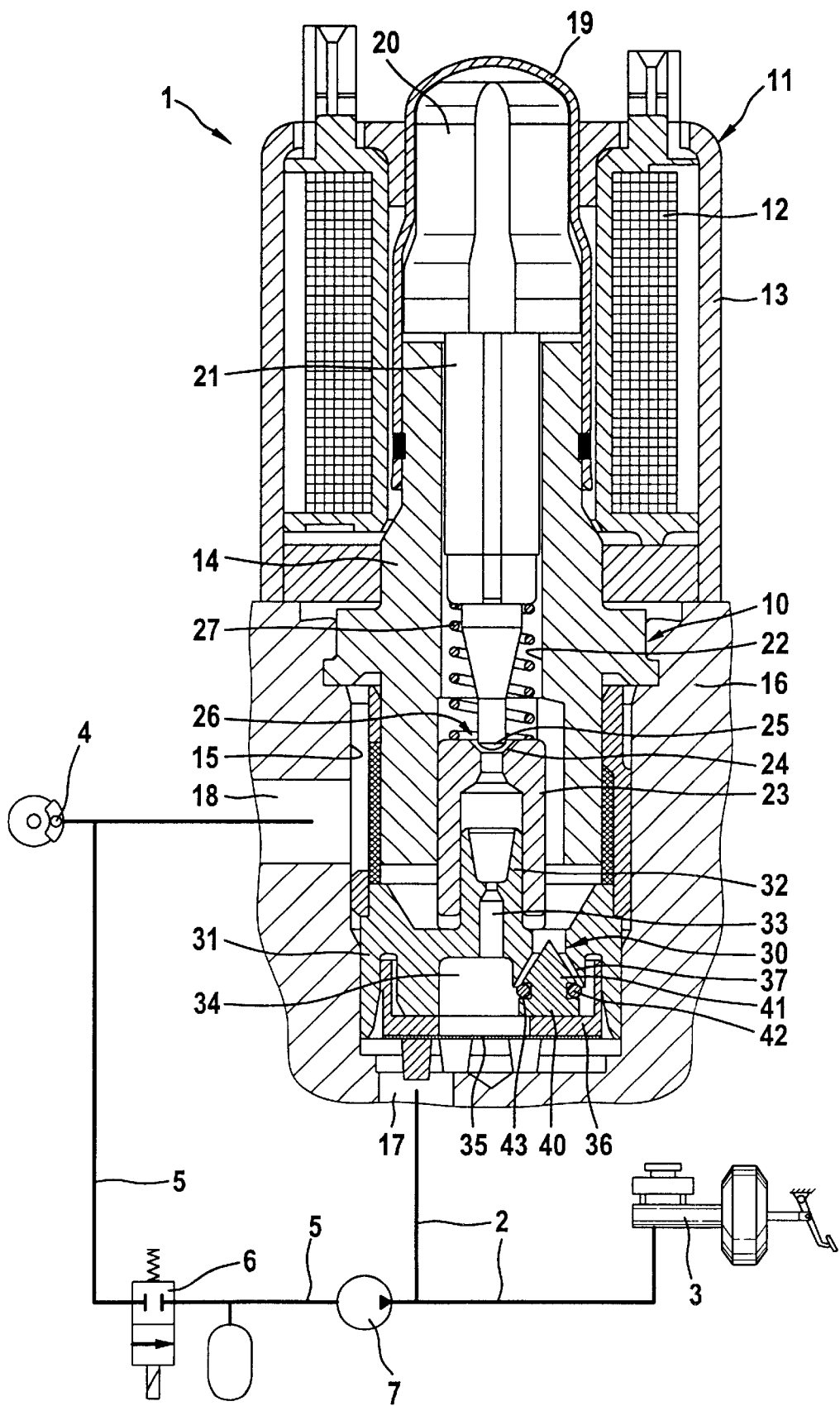

SOLENOID VALVE WITH A CHECK VALVE

BACKGROUND OF THE INVENTION

The invention is directed to solenoid valves, and more particularly to a solenoid valve incorporating an improved check valve.

DESCRIPTION OF THE PRIOR ART

A solenoid valve of the type with which this invention is concerned is disclosed in DE 196 35 693 A1, and in which the check valve has a ball-shaped closing body made of steel, which is associated with a hollow conical valve seat in a valve component. Since the valve component is injection molded of thermoplastic synthetic resin or plastic material and has a non-uniform mass distribution, dimensional deviations of the valve seat occur during manufacture and during insertion with the solenoid valve into a housing of a hydraulic unit of a slip-controlled hydraulic brake system of a motor vehicle and these dimensional deviations, in combination with the dimensionally stable closing body, lead to leakage problems in the check valve at low pressures.

SUMMARY OF THE INVENTION

The solenoid valve according to the invention has the advantage over the prior art that even at low pressures in the check valve, the sealing function of the rubber-elastic sealing ring is effective, but at higher pressures, the dimensionally stable closing body protects the sealing ring from being overloaded and damaged by virtue of the fact that the closing body reduces the gap in relation to the valve seat and therefore largely prevents an extrusion of the rubber-elastic sealing ring into the gap. As a result, on the one hand, the disadvantages of the known solenoid valves are overcome and on the other hand, difficulties in sealing at high pressure due to the relatively soft sealing ring are prevented in a simple manner.

BRIEF DESCRIPTION OF THE DRAWING

The foregoing and other features and advantages of the invention will be apparent from the detailed description contained herein below, taken with the drawing in which the single FIGURE depicts the invention in simplified form.

DESCRIPTION OF THE PREFERRED EMBODIMENT

In a slip-controlled hydraulic motor vehicle brake system that is only partially shown, a solenoid valve 1 depicted in the sole FIGURE is disposed in a line connection 2 between a master cylinder 3 and a wheel brake cylinder 4. A second solenoid valve 6 and a pump 7 are disposed in a brake system line connection 5 that bypasses the solenoid valve 1. The solenoid valve 1, which is open when without current, and the solenoid valve 6, which is closed when without current, are parts of an apparatus for slip-dependent modulation of the brake pressure acting in the wheel brake cylinder 4.

The solenoid valve 1 is comprised of two units: a hydraulic part 10 and an electric part 11, which is plug-connected to the hydraulic part. The electric part 11 is essentially comprised of a magnet coil 12 and a yoke 13. The hydraulic part 10 has a valve housing 14, which is fastened in a receiving bore 15 of a valve block 16 by means of a caulk connection. A pressure fluid inlet 17 that communicates with the master cylinder 3 feeds into the bottom of the receiving bore 15; in the circumference, a pressure fluid outlet 18 leads from the receiving bore and communicates with the wheel brake cylinder 4. Outside the valve block 16, a valve dome 19 that is enclosed by the electric part 11 is fastened to the valve housing 14. This valve dome 19 has a magnet armature 20 guided inside it in a longitudinally mobile fashion, which cooperates with a tappet 21. The tappet 21 extends in a through bore 22 of the valve housing 14 and this through bore 22 contains a sleeve-shaped valve body 23 remote from the valve dome. This valve body 23 has a valve seat 24 that communicates with the pressure fluid inlet 17. The valve seat 24 is associated with a closing member 25 embodied on the tappet 21. The valve seat 24 and the closing member 25 constitute a seat valve 26 which can be switched from its depicted open position into its closed position counter to the force of a restoring spring 27 through excitation of the magnet coil 12.

For a rapid brake pressure reduction in the wheel brake cylinder 4 and particularly for the case in which the solenoid valve 11 incorrectly remains in its closed position, a check valve 30 is provided, which is disposed in the bypass to the seat valve 26. To this end, the receiving bore 15 of the valve block 16, in the space disposed between the pressure fluid inlet 17 and pressure fluid outlet 18, contains a valve component 31, which fills the bore cross section and engages in the valve body 23 in a form-fitting manner by means of a central projection 32. The valve component 31, which is injection molded of a thermoplastic synthetic resin or plastic, has an opening 33 extending in its longitudinal axis, which transitions into a recess 34 remote from the projection. Toward the pressure fluid inlet 17 of the receiving bore 15, the recess 34 is closed by a filter disk 35 in a closure part 36 that is slid onto the valve component 31 remote from the projection. In addition, a hollow conical valve seat 37 of the check valve 30, which communicates in a pressure fluid-carrying manner with the recess 34 and the pressure fluid outlet 18, is embodied in the valve component 31.

The check valve 30 has a dimensionally stable closing body 40 made of metal or plastic, which has a section 41 that is embodied as complementary to the hollow conical valve seat 37. A rubber-elastic sealing ring 42 is provided on the section 41 and extends concentric to its longitudinal axis. In the exemplary embodiment, this sealing ring is an O-ring which is contained in a circumferential groove 43 of the closing body 40. As the drawing shows, the sealing ring 42 is accommodated with the greater portion of its cross section in the circumferential groove 43; with the remaining portion of the cross section, the sealing ring 42 protrudes beyond the circumference surface of the conical closing body section 41. In contrast to the exemplary embodiment, the sealing ring 42 can be joined to the closing body 40 by means of material adhesion, for example in a common injection molding procedure.

In the depicted rest position of the check valve 30, the closing body 40 is supported against the closing part 36 and the passage between the pressure fluid inlet 17 and the pressure fluid outlet 18 is open as a result of a gap between the valve seat 37 and the closing body section 41 with the sealing ring 42. When the check valve 30 is closed, the rubber-elastic sealing ring 42 seals the above-mentioned passage by engaging with the valve seat 37. As a result, even at low pressures, dimensional deviations of the valve seat 37 are compensated for by the elasticity of the sealing ring 42. With increasing pressure differential between the pressure fluid inlet 17 and the pressure fluid outlet 18, the closing body 40 is pressed deeper into the valve seat 37 and the sealing ring 42 is more intensely deformed. At the same time, the gap between the valve seat 37 and the section 41 of the closing body 40 decreases until at very high pressures, the closing body section comes into contact with the valve seat and additionally assumes the sealing function of the sealing ring 42. The reduction of the gap prevents the highly stressed sealing ring 42 from being pressed into the gap and destroyed.

The foregoing relates to a preferred exemplary embodiment of the invention, it being understood that other variants and embodiments thereof are possible within the spirit and scope of the invention, the latter being defined by the appended claims.

We claim:

1. In a solenoid valve (1) for slip-controlled hydraulic brake systems of motor vehicles of a type having a valve body (23) including a dimensionally stable closing body having a seat valve (26) disposed between a pressure fluid inlet (17) and a pressure fluid outlet (18) and having a check valve (30) disposed in a bypass to the seat valve (26), the check valve (30) includes a dimensionally stable closing body (40) and a hollow conical valve seat (37) embodied in a valve component (31) formed of plastic and secured tightly in a valve block with a nonuniform mass distribution, the closing body (40) has a section (41), which is embodied as complementary to the hollow conical valve seat (37) and which accommodates a greater portion of a cross section of a rubber-elastic sealing ring (42) that is disposed on a circumference of the section (41), concentric to an axis of the section (41).

2. The solenoid valve according to claim 1, wherein the sealing ring (42) is an O-ring.

3. The solenoid valve according to claim 1, wherein the sealing ring (42) is joined to the closing body (40) by means of material adhesion.

4. The solenoid valve according to claim 1, wherein the closing body (40) is comprised of metal.

* * * * *